US012103154B2

(12) United States Patent
Szeklicki

(10) Patent No.: US 12,103,154 B2
(45) Date of Patent: Oct. 1, 2024

(54) SURFACE WEDGE TOOL

(71) Applicant: Christopher John Szeklicki, Brick, NJ (US)

(72) Inventor: Christopher John Szeklicki, Brick, NJ (US)

( * ) Notice: Subject to any disclaimer, the term of this patent is extended or adjusted under 35 U.S.C. 154(b) by 0 days.

(21) Appl. No.: 17/492,911

(22) Filed: Oct. 4, 2021

(65) Prior Publication Data

US 2022/0105615 A1 Apr. 7, 2022

Related U.S. Application Data

(60) Provisional application No. 63/087,361, filed on Oct. 5, 2020.

(51) Int. Cl.
*B25D 1/02* (2006.01)
*B25F 1/00* (2006.01)

(52) U.S. Cl.
CPC ................ *B25D 1/02* (2013.01); *B25F 1/006* (2013.01); *B25D 2250/105* (2013.01)

(58) Field of Classification Search
CPC . B25D 1/02; B25D 1/00; B25D 1/006; B25D 1/08; B25D 2001/0046; B25D 2001/0053; B25D 3/169; B25D 25/00; B25D 21/06; B25F 1/006; B25F 1/00
USPC ........ 7/103, 105, 158; 30/39, 90, 95, 97, 98, 30/101, 102; 83/520
See application file for complete search history.

(56) References Cited

U.S. PATENT DOCUMENTS

| | | | | |
|---|---|---|---|---|
| 170,972 | A * | 12/1875 | Thayer | B25F 1/00 254/26 R |
| 4,041,558 | A | 8/1977 | Victor | |
| 4,433,709 | A * | 2/1984 | Porter | B25F 1/00 81/26 |
| 4,482,131 | A | 11/1984 | Hamilton | |
| 4,620,407 | A | 11/1986 | Schmid | |
| 4,658,457 | A | 4/1987 | Rokita | |
| 5,099,724 | A | 3/1992 | Reddy | |
| 5,297,306 | A * | 3/1994 | Shandel | B25F 1/02 7/114 |
| 5,513,411 | A * | 5/1996 | Simon | A47L 25/00 15/176.1 |
| 5,546,625 | A | 8/1996 | Mealey | |
| 5,749,113 | A | 5/1998 | Witter | |
| 5,925,204 | A | 7/1999 | Hoffmann | |
| 6,253,454 | B1 | 7/2001 | Gietzen | |
| 6,266,834 | B1 * | 7/2001 | Walsh | B25D 1/04 7/144 |

(Continued)

*Primary Examiner* — Bryan R Muller
*Assistant Examiner* — Dana Lee Poon

(57) ABSTRACT

A multifunctional substrate repair tool that has a linear body and a plurality of implements on both ends. A head on one end houses a nail claw and ports for selective attachment of blades on the sides and on the top. The ports connect one or more arced blades, each having a striking surface, for penetrating and breaking apart substrate filler layer. Repeated strikes encompassing the fastener head removes filler layer material. A grip connects the head to a bulbous end having at least one of a peen and a protrusion. These are used to indent substrate features and, together with an optional abrasive surface, also located on bulbous end, to dress the cavity left by the blade and nail claw functions. The bulbous end is used as a strike surface for blade and indenting features alike.

17 Claims, 13 Drawing Sheets

(56) References Cited

U.S. PATENT DOCUMENTS

| | | | | |
|---|---|---|---|---|
| 6,347,496 | B1 | 2/2002 | Pinkins | |
| 6,519,858 | B2 | 2/2003 | Willoughby | |
| 6,755,002 | B2 | 6/2004 | Pandrous | |
| 7,152,380 | B2 | 12/2006 | Pendrous | |
| 7,540,122 | B2 | 6/2009 | Trudeau | |
| 8,991,128 | B2 | 3/2015 | James | |
| 9,656,379 | B2 | 5/2017 | Doster, Jr. | |
| D839,072 | S | 6/2019 | Hung | |
| D852,018 | S | 6/2019 | Hung | |
| 2004/0261188 | A1* | 12/2004 | Mathis | B25F 1/006 7/158 |
| 2005/0172415 | A1* | 8/2005 | Beek | B25F 1/00 7/146 |
| 2006/0075572 | A1* | 4/2006 | Young | B25F 1/006 7/138 |
| 2006/0272165 | A1* | 12/2006 | Brenchley | B26F 1/32 30/358 |
| 2011/0088170 | A1* | 4/2011 | Crookston | B25D 1/06 7/122 |
| 2011/0219918 | A1 | 9/2011 | Monahan | |
| 2015/0028273 | A1 | 1/2015 | Pell | |
| 2015/0231776 | A1* | 8/2015 | Doster, Jr. | E04F 21/18 254/26 R |
| 2015/0360362 | A1* | 12/2015 | Chapman | B25F 1/006 7/167 |
| 2016/0158583 | A1* | 6/2016 | Kao | A62B 3/005 7/138 |
| 2016/0354909 | A1* | 12/2016 | Weinberger | A62B 3/005 |
| 2018/0036873 | A1* | 2/2018 | Workman | B26B 23/00 |
| 2018/0117753 | A1* | 5/2018 | Bar | A62B 3/005 |
| 2018/0297188 | A1* | 10/2018 | McCann | B25G 1/102 |

* cited by examiner

SURFACE WEDGE TOOL

FIELD OF THE INVENTION

This invention relates to the repair and finishing of interior wall surfaces, and more specifically to an apparatus and method for revealing wall fasteners in drywall and other interior wall substrates underneath filler layers.

BACKGROUND

Interior walls in residential and some commercial dwellings are constructed by means of fastening drywall or industry related substrate to building studs or an industry related substrate (anchor). While drywall may be fastened to the studs with screws (threaded fasteners), it is typically fastened with nails (non-threaded fasteners) to save installation time and expense. Nail heads are covered over with joint compound (filler layer) which is then sanded flat before the wall is finished with paint.

As time passes, temperature and moisture levels fluctuate. All building materials settle by means of gravity and general home use. These ever-changing conditions produce movement in the substrate, fastener, and anchor layer. When drywall separates from wooden studs because of 'expansion and contraction', non-threaded fasteners allow significant movement between substrates. During this flexing the joint compound layer separates from the head of the fastener but remains adhered to the paint layer on the surface. After an expansion event, the substrate layer contracts and the joint compound layer that has been separated will then protrude outward causing varied convex damage. This damage can occur over the surface of the fastener or anywhere adjacent to the fastener location. This is what is referred as "nail pop".

The term "nail pop" can be misleading for it implies that the nail itself has moved outward from the substrate when in fact it is the joint compound that has not resettled back with the wall contraction event. Furthermore, additional fastened substrate that has also become loose does not necessarily show the nail pop effect and is often left unfixed. A preferred, more accurate name would be recurring filler layer damage due to expansion and contraction or filler layer damage (FLD).

This contradiction can be shown by the perpetual need for a nail pulling device or claw of some type as the nail is almost always still very secure in the substrate surface. For example, as discussed below, U.S. Pat. No. 6,519,858 is specifically designed to force the nail outward from the substrate because of the assumed difficulty in accessing the non-threaded fastener to be pulled.

There are rare instances where one will find that the nail has actually loosened. Experience has shown this to be the result when the adjacent drywall has been either intentionally re-secured or driven back toward the anchor (wall stud) by unintended force.

To fully correct the problem and prevent recurrences, the exact nail location must be found or revealed underneath the paint and joint compound layers. This is done by removing areas of joint compound around the nail heads. The convex damage can be large, and a particular convex feature can extend up to 3 inches away from the general center of the nail head on the wall surface. The nails are then pulled and replaced with one or more drywall screws; one above and one below the original nail. A new layer (or pass) of wet joint compound or spackle must then be spread over the cavity and new drywall screw holes. After one or more passes and subsequent sanding the spot will be ready for paint.

Joint compound application requires a surface clean and free of convex imperfections. Any imperfections including outward protruding paint chipped edges and ripped/torn drywall paper must either be removed or pushed into the wall surface to be repaired to ensure a layer of joint compound can be properly applied in a uniform fashion.

A commonly used method involves beveled cutting and/or digging at the wall with a utility knife to expose the nail head and/or cut the remaining hole to achieve a clean perimeter. Only after a cleaned and fully concave cavity is achieved, the nail can be pulled, and a joint compound material applied.

The physical act of cutting a precise and uniform access hole to the displaced nail head with a utility knife can be overwhelmingly tedious, time consuming, and may even involve personal injury (as is the case in any action involving utility knives). Note that the utility knife is not designed for beveled cutting at a perpendicular angle which must be done to achieve a clean perimeter for filler application.

When cutting filler layer damage with a utility knife, one will most often cut through the paint layer, directly through the filler layer and into the drywall paper layer. This will result in torn paper edges that need re-cutting and/or to be coated/primed with paint to deburr loose paper edges for finish paint application.

Though one can see that the nail has been displaced by the resulting filler layer damage, the protrusion may occur slightly adjacent to the actual nail head placement in any direction which makes the task of locating the nail head very inexact. This misdirection will almost certainly create more, if not worse, damaged wall area in the form of unruly paper tears and sections of uneven broken drywall, that will also then need to be corrected if pursued with a utility knife. This is an extreme waste of time as the attempt to identify and solve the problem has now resulted in numerous levels of extra work and extra repair.

When there are multiple FLD areas present this pattern will repeat incessantly. Experience has shown that this pattern can exist with most filler layer damage repair attempts, and that it is usually deemed an unbearable undertaking—not worth the time or effort.

Equally important, known methods require a certain level of physical strength and ability, and those with arm, wrist or hand injury, fatigue, or weakness occurring from any form of upper body injury or inflammation may be unable to repeatedly perform these tasks as needed.

Another method may be to use a 'drywall hammer', but it is only a temporary fix. A drywall hammer has a wide waffle hammerhead to reset the original nail back into place without removing the nail. The waffle head is intended to indent and break up the drywall protrusion (filler layer damage) making it easier to scrape the chipped paint that is left after impact to reset the loose nail. This method does not require removing the nail, and it does not fully resolve the recurrence of the original filler layer damage.

The 'drywall hammer' is a very heavy and costly tool that does not fully resolve the problem.

International Publication WO2003035568A2 discloses a multifunctional tool for nail pops. The tool is assembled into different configurations to achieve desired results. The tool is equipped with a sharp circular blade to bore a hole into the substrate encompassing the nail to be pulled. Another configuration provides a nail set for the fastener to be pushed back into the anchor layer. The tool is complicated and takes time to assemble for various functionality. The tool has a sharpened edge on the cutting apparatus to bore a hole. Boring a hole in substrate with a sharpened blade will undoubtedly compromise the paper layer underneath the paint layer and result in a deeper cavity, thus requiring extra layers of new filler layer material. The tool has no apparatus for indenting the substrate surface for new filler layer application. The tool of WO2003035568A2 is a time consuming and complicated device which does not improve speed and efficiency, does not protect paper layer, and does not account for further indentation of surrounding convex substrate for surface finishing.

U.S. Pat. No. 9,415,495 discloses a tool for removing embedded nails. The tool includes a sliding fulcrum and a dimple. The dimple comprises a circular recess with a protruding substantially wide circular flat rim. The rim forms an indentation around the nail head when the dimple is positioned over the nail head and striking surface of the tool is struck. The tool disclosed in the '495 patent creates an indentation around the nail head with the blunt surface of the rim, which crushes the drywall and can leave the drywall uneven and/or the paper surface of the drywall torn. The tool does not address cutting or preparing even surface for filler layer repair. This tool is primarily focused on the pulling of non-threaded fasteners. The primary function being an alternative to a traditional hammer claw.

The tool described in the '495 patent does not provide an acceptable solution for filler layer damage and does not allow for clean excavation of all fasteners. The tool of the '495 patent is also impractical for it fails to address surface preparation and is too cumbersome for use on ladders and to carry on a person.

U.S. Pat. No. 6,519,858 discloses a tool for unseating embedded nails by penetrating substrate and creating a dimple impression to create space for a claw device. The tool consists of a straight shaft with a cutting element on one end and a striking surface on the other. The cutting end consists of a blade designed to fit the particular nail size that it is targeting. The shaft of the blade curves upward at a (roughly) 30-degree angle before turning 90 degrees and up to the striking surface. The upward turned radius is the dimpling element as it follows the blade downward creating an impression so that the nail can be more easily pulled by a claw. The tool is driven into the substrate with a force strong enough to attempt to unseat the nail head outward, to increase the space between the nail head and the substrate to aid in positioning the pulling device.

The tool of the '858 patent does not address the extremely difficult task of locating the fastener that it intends to pull or how to address large areas of joint compound removal to locate the fastener. One must assume that the nail head must be visible in order for the user to accurately place the tip within millimeters around the circumference of the nail head as it demands such accuracy to be effective to any means. The 90-degree substrate striking angle coupled with excessive force will certainly disrupt additional substrate areas causing cracks, further separation, and additional filler layer damage on surrounding substrate surface.

Using the tool of the '858 patent would require multiple different tools in a set, containing different size nail cavities for different size nails; one on each tool. The nail head size must be determined before tool selection. Therefore, the intended nail to pull must be visible, and not hidden under a filler layer. This tool is primarily focused on the unseating of a non-threaded fastener from a substrate by use of force delivered at 90 degrees to the surface while creating an impression around the exposed nail head to give the claw adequate pulling space.

Addressing filler layer damage and the recurrence of have never been the industry standard. Some professionals choose to ignore the problem altogether claiming that non-professionals do not notice filler layer damage. Some will only address the obvious and apparent nail pops usually located in the center of the walls. filler layer damage has an inherent nature of becoming visible only after the first coat of paint is applied due to the dramatic moisture increase from the paint. When this occurs, an industry professional will most likely choose to continue painting in order to finish the contracted work rather than take two steps backwards and repair the spots. The professional would have repaired the spots upon performing initial wall preparation, but the imperfections had not shown themselves at that point in time.

The solution is to address the filler layer damage before it reveals itself midway through the project. Most industry professionals would not do this because of the tedious nature of fixing filler layer damage. If the task of fixing filler layer damage was simplified, more would do so on initial wall surface preparation.

By identifying a single occurrence of filler layer damage on one stud, one can assume that most, if not all, fasteners in the stud will need to be removed. Fasteners are usually placed at or around the same heights along all wall studs, which also have standardized placement. These locations can be assumed and can be located quite easily with a trained eye.

There is a serious need for industry standardization and conformity of procedure via an easier, cleaner method and tool for the removal of convex wall damage due to expansion and contraction. Equally important is the prevention of unnecessary filler layer damage after work completion.

With the known methods and tools described above, every effort can lead to a different outcome. Each can be unsafe and can require too much physical effort and physical ability. Each is unnecessarily time consuming and can create extra damage and thus extra work. Additionally, all methods do not specifically address joint compound removal efficiently enough to reveal fasteners that have not been indicated by visible wall damage.

The present invention solves the problems in the prior art and provides a revolutionary method to minimize work hours and physical demand, increase safety and reduce tools needed to perform work, install consistency in workflow, and deliver previously unknown product assurance. The present invention provides solutions to all tasks required and a method for uniformity and efficiency by enabling the reveal and removal of fasteners, the repair of substrate filler layer damage that has not been visibly shown, and the repair of existing substrate filler layer damage; thus, completely preparing the substrate surface for new filler layer application.

SUMMARY

The present invention provides a low impact substrate tool designed to quickly and cleanly reveal fastener heads covered by filler layer. The tool allows for any size opening to be excavated out of a substrate filler layer for any needed repair and primarily the reveal and subsequent replacement of substrate fasteners both threaded and non-threaded. The present invention also prepares the substrate surface, leaving it clean and indented for new filler layer application. The present invention addresses all of the problems of the aforementioned methods in one tool.

The present invention concentrates on revealing fasteners below filler layer and related issues regarding filler layer repair, rather than the fastener itself as the primary objective.

Designating filler layer material removal as the prime objective, one need not know the exact fastener location, nor does said fastener need to be indicated by any type of wall damage. In addition, the present invention allows a user to re-secure a larger area of wall surface to achieve a longer lasting final product. The present invention offers a safer, significantly more functional alternative to accomplish tasks. A tool and method diminishing physical effort and increasing ergonomic advantage from previous methods known.

The present invention is a multifaceted tool. In one exemplary embodiment, the tool includes a handle. For example, the tool may have an ergonomic grip handle attached to a head which also functions as a port for blade attachments and a hammer claw and provides all non-electric tasks needed for substrate filler layer repair, fastener removal, and final preparation for fastener replacement and new filler layer application.

The tool further includes a blade. In some embodiments, the tool uses an arced blade to be presented to the substrate surface at an approximately 45-degree angle (e.g., 40-50 degrees). The open-ended arced nature of the blades serves three unique features of the present invention.

First, similar to a 'roughing gouge' used for traditional woodturning on a 'wood lathe', the present invention employs a slightly sharpened, arced blade which has an edge that is ground square. Like the roughing gouge, when driven at an angle, only a small portion of the blade (the low point) penetrates into the drywall/paper layer just as only a portion of the roughing gouge blade enters the turning wood surface. By only piercing a small section of the surface, the paper layer of the drywall will stay intact. This angled striking technique allows the outer portions of the arced blade to remain angled upward, out of the surface of the wall. This design and method will break up (or further crack) the filler layer and wedge the waste material upward in the direction the user is striking. The blade's arced design allows the waste material to escape from the opening of the arc.

Using a discerning eye and a few repetitive easy strikes from the mallet, a user will only need to rotate the blade around the desired extraction area in approximately three different encompassing locations or less to fully extract the filler layer material out.

Second, as described above, in operation only a small section of the blade is actively used to penetrate the substrate surface and physically remove the waste material. The remaining arced blade circumference area (blade wings) stays above the substrate surface and the circular design allows any arc within the provided blade diameter to be used as a cutting section for the user to "roll over" the tool to the next strike location without having to fully reposition the entire tool. The circular design minimizes the movements needed to fully rotate an arced blade around a given diameter. The minimized movement thus provides an ergonomic advantage by allowing the user to almost fully keep the blade in contact with the substrate surface for the entire cutting/wedging process per individual fastener reveal.

Third, each squared off end of the arced blade circumference area (blade wings) forms an approximately 90-degree angle as the blade surface is turned downward to where it is connected the universal attachment port. The blade opening between the wings serves two purposes. A) the sharp edges that define the opening can be used as a sharp precise edge to scrape rough paint edges that have been loosened but have not fallen off the surface. B) the absent blade area between the wings allows wedged material to be dispersed when making repeated strikes. Like a geological seismic event, initial strikes can transfer energy down already cracked filler layer causing damaged areas to break apart and fall off the substrate without further striking required, subsequently enabling additional conservation of working time and physical effort.

Previously known methods required striking the wall at 90 degrees to achieve the desired outcome of their claim. The present invention has proven to be ineffective when used in this manner. The present invention is designed to wedge, scoop or break material with an angled attack and has proven highly effective when used as designed.

In some embodiments, the tool has a connection port circumference that corresponds the circumference of the blades. Preferably the connection port may house a threaded insert feature for additional attachments.

In some embodiments, the tool has a multi-port head, allowing ease of use for left/right-handed use, and a blade at the top of the head for hard-to-reach areas and areas adjacent to corners.

In some embodiments, the tool has a rounded tail end (utility bulb). The utility bulb is multi-functional. One side houses the indentation peen used to indent the cavity after wall material and fastener have been removed. The opposite side houses the penetration point which is a narrower triangular pointed protrusion designed to pinpoint smaller convex areas and can also be used as a nailset if the nail has been determined not to be replaced. The penetration point side is also used as the strike surface for the indentation peen and conversely the strike surface for the penetration point is the indentation peen.

The utility bulb may house abrasive surface area(s) to scuff the cracked paint area for filler preparation. The utility bulb can be used to correct other non-fastener related drywall convex imperfections.

In preferred embodiments, the tool includes a built-in hammer claw to reduce the number of tools a user needs to perform the fastener removal task.

The tool may be used with a hammer or rubber mallet for all strikes.

The tool may be offered with varied blade shapes and attachments for other joint compound/drywall related imperfections.

In one exemplary embodiment, a surface wedge tool is provided including a handle, an arced blade attached to a top portion of the handle, a striking surface on the handle opposite the blade, a peen on a bottom portion of the handle, and a striking surface on the handle for the peen. In some embodiments, the top portion of the handle includes a port, wherein the arced blade is removably attached to the handle in the port. The tool may further include a nail claw attached to the tool and a striking surface opposite to the nail claw.

In some embodiments, the tool includes one or more penetration protrusions (e.g., on a bottom portion of the tool) and a striking surface for one or more penetration protrusions. In some embodiments, the tool includes an abrasive surface attachment or coating on the bottom portion of the tool.

In one exemplary embodiment, the surface wedge tool includes a handle having a rectangular head, an arced blade attached to a first side of the head, a striking surface for the arced blade on a second side of the rectangular head opposite the first side, a nail claw attached to a third side of the head, a peen on a bottom portion of the handle, and a striking surface on the handle for the peen.

Further provided is a method of exposing and removing wall fasteners under filler layer, and preparing substrate surface for new filler layer application. The method may include the steps of providing a tool having a handle, an arced blade, a nail claw, and a peen; placing an enclosed side of the arced blade of a tool at 40-50 degree angle to a wall adjacent to a filler layer material to be removed; striking the tool with a mallet to achieve a first desired cut; striking the tool with a mallet to achieve a second desired cut, and repeating until a portion of the filler layer material is removed; driving replacement fasteners; pulling old fasteners with the nail claw of the tool; indenting a substrate cavity with the peen of the tool; applying an abrasive element to cavity perimeter; and applying a new filler layer.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Dimensions are recited herein to provide examples of how embodiments may be constructed but are not intended to limit the invention to any particular size.

Figure 1:
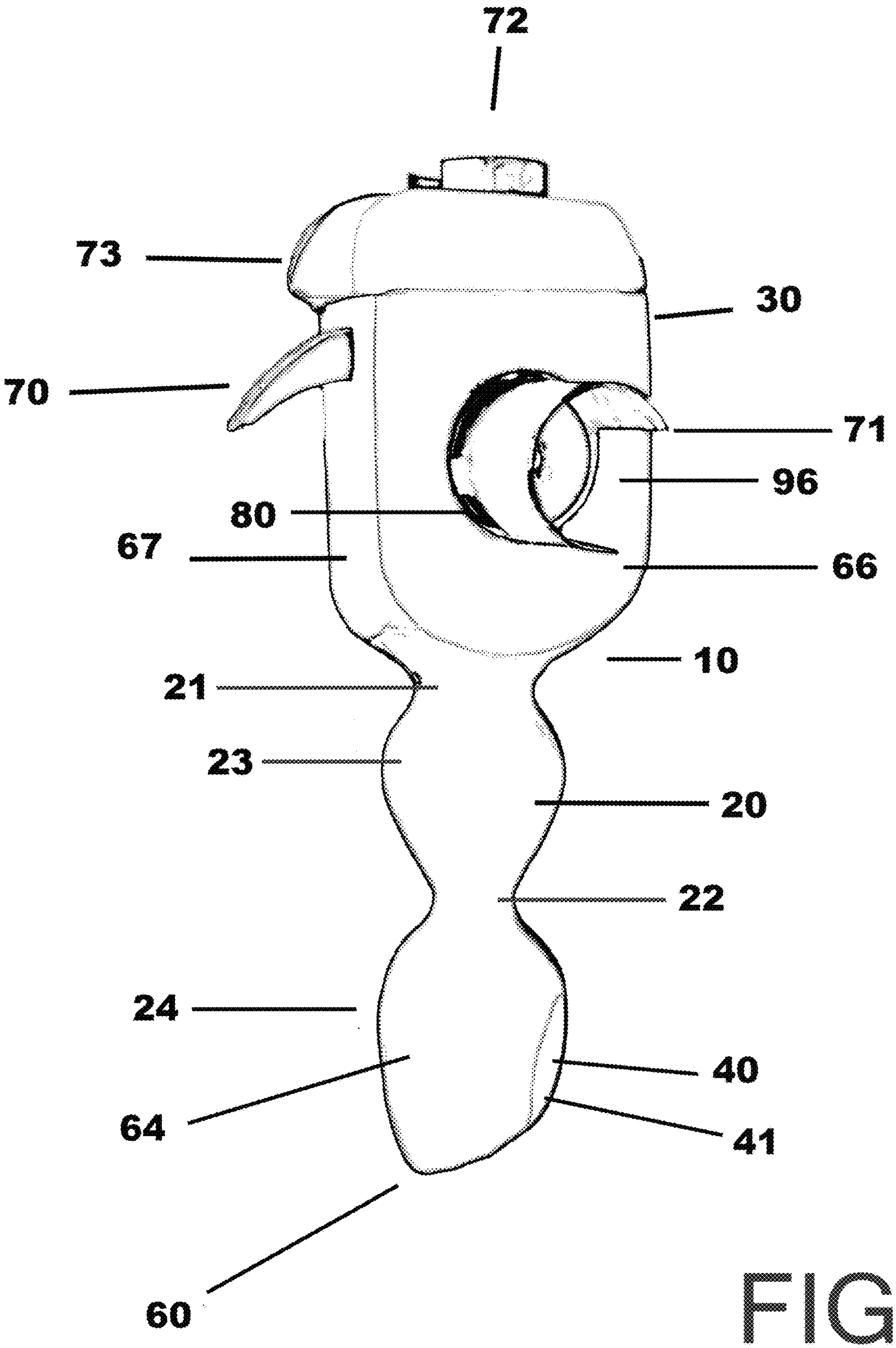
FIG. 1 shows a perspective view of a tool according to an exemplary embodiment in its whole form featuring sides one and two.

FIG. 1 shows an exemplary embodiment of a tool (10) which is approximately 10 to 20 centimeters in length (e.g., 15.875 centimeters) having a utilitarian handle (20) and a five-sided, multifaceted head (30) at a top portion of the tool (10). The handle (20) is approximately 5 to 10 cm (e.g., 7.620 cm) in length, having an hourglass shape and narrow connecting segment (21) proximal to the head. The hourglass shape is comprised of two bulbs with narrow connecting segment (22) between them. The bulb proximal to the head is the grip (23). In the exemplary embodiment, the largest diameter of the grip (23) is proximal to the head and measures 3 cm. Narrow connecting segment (21) proximal to the head measures 2 cm in diameter at its smallest point then widens out to the full rectangular head measurement (4 cm L×3.5 cm W×7.5 cm H). The grip (23) gradually diminishes to narrow connecting segment (22) with a diameter of 1.35 cm. This connects to utility bulb (24). The utility bulb (24) is spherical and has a diameter of 3.30 cm. The narrow connecting segments (21,22) allow for hand/finger placement on either end of the tool (10). Narrow connecting segment (22) provides the negative space to form the utility bulb (24) at a bottom portion of the tool (10). The utility bulb (24) houses an indentation peen (65) (see FIG. 4, 9*d*), a penetration point (60) (or protrusion), an abrasive surface (40), an abrasive surface bed (41), an abrasive surface (50), and an abrasive surface bed (51) (see FIGS. 2, 9*c*,10).

Figure 5:
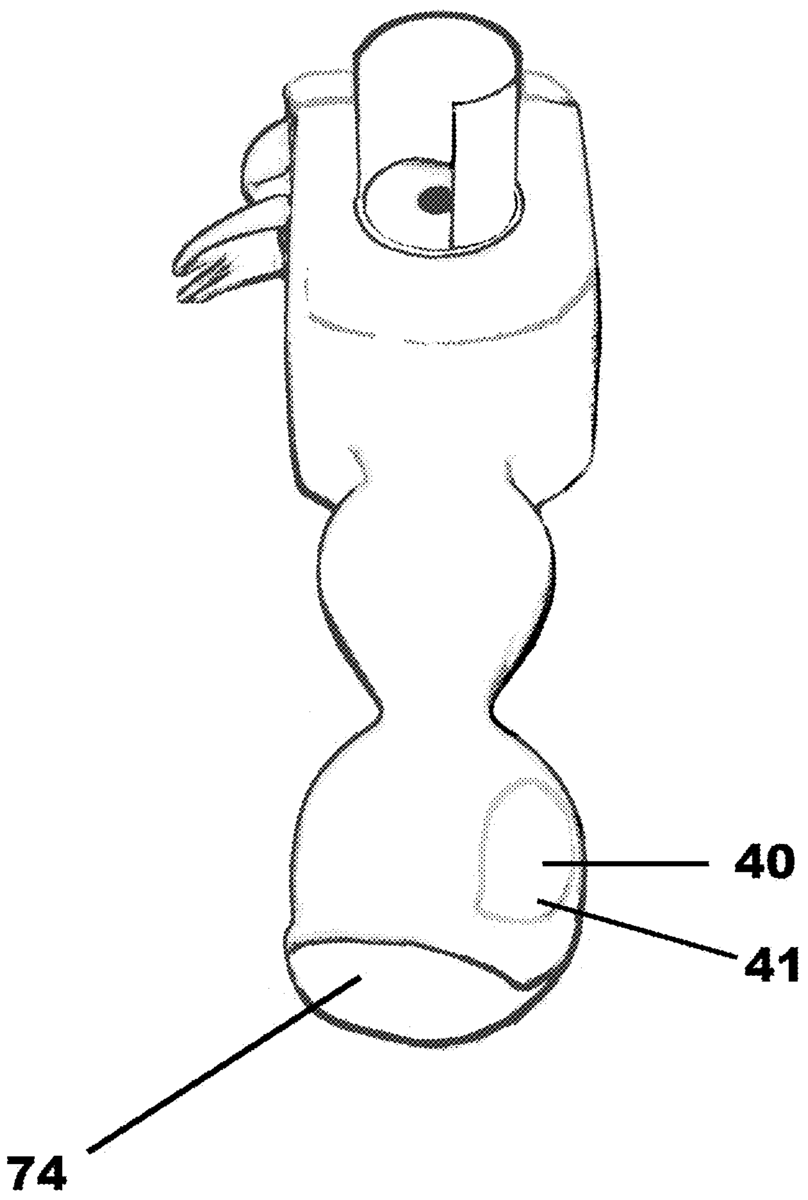
FIG. 5 shows a perspective view of the tool in its whole form featuring the tail end of the handle.
Figure 6:
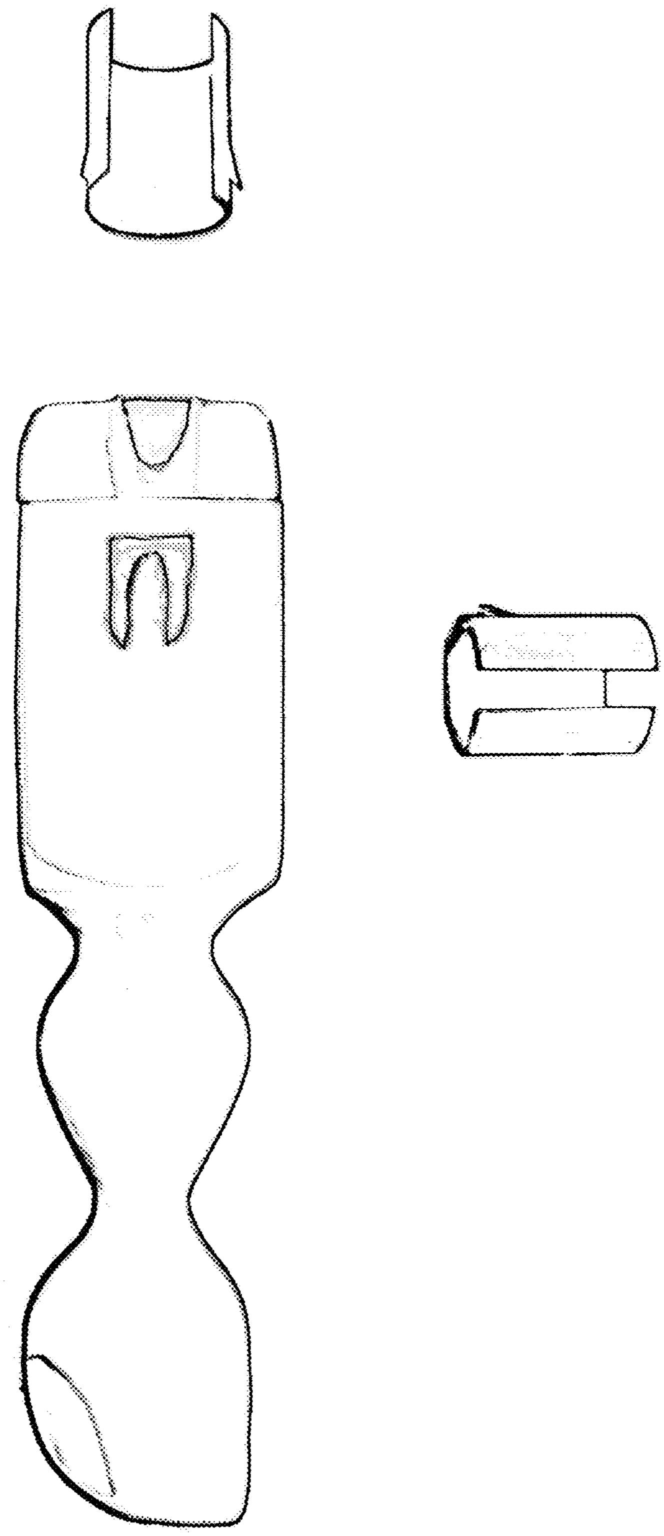
FIG. 6 shows an exploded view of side two showing the top and side blades removed from the universal attachment ports.
Figure 9A:
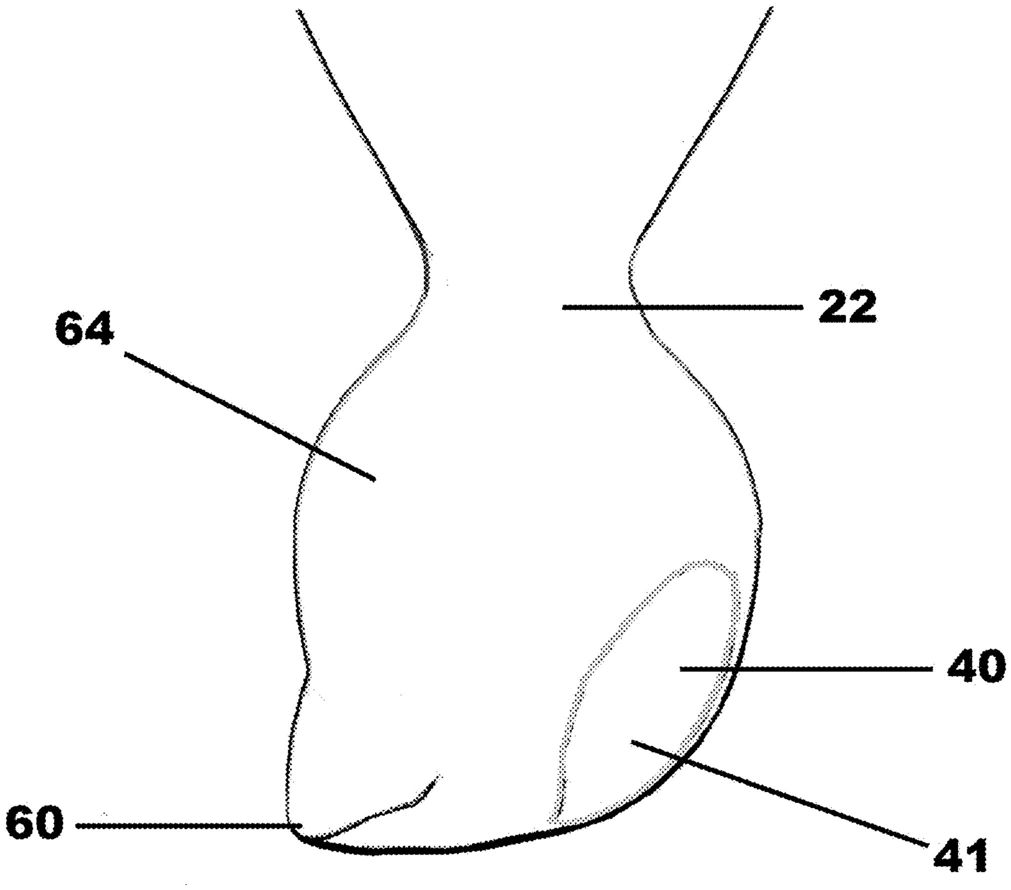
FIG. 9*a* shows a detail perspective view of the utility bulb on side 1-2.
Figure 9B:
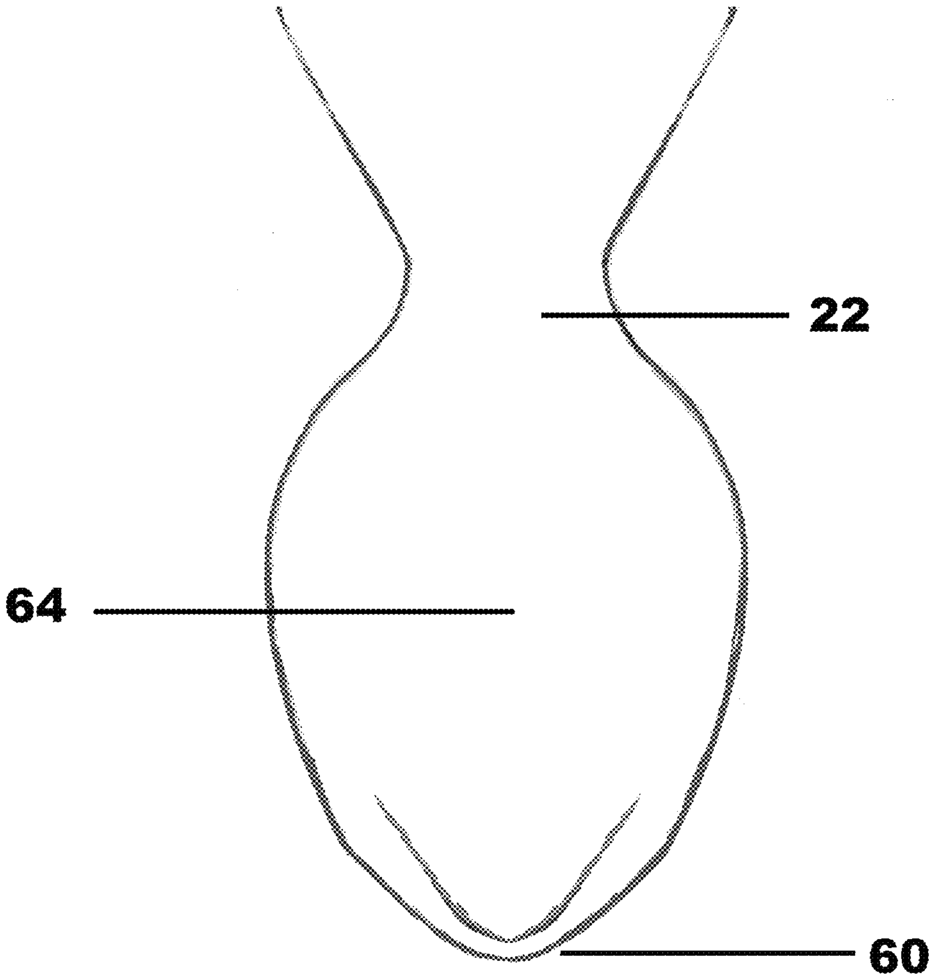
FIG. 9*b* is a detail side view of the utility bulb, featuring the penetration point at center.

Each feature or implement of the tool (10) may have a corresponding strike surface on an opposite side or end. For example, the utility bulb (24) includes a strike surface (74) on the bottom for a top attachment (see FIG. 5), and a strike surface (64) for the indentation peen (65) (see FIG. 9*a-c*).

In the example shown in FIGS. 1-4, the multifaceted head (30) has four sides as well as a top or distal end (see FIG. 8) that will be referred to as side (75) interchangeably. In some embodiments, side (66) (FIG. 1) enables connection of a side blade (71) via a universal attachment port (80). The universal attachment port (80) may be, for example, a groove or series of grooves in the side (66) adapted to receive various side attachments, such as the side blade (71) (e.g., via press fitting and/or via attachment mechanisms). In some embodiments, side (68) (FIG. 3) enables connection of the side blade (71). A strike surface (96) for universal attachment port (90) is located on side (66) (FIG. 1).

In some embodiments, the blade (71) has a blade shape being ¾ of a circle and 2.54 cm in diameter. In some embodiments, blade shape is ⅝ of a circle and 2.54 cm diameter. In some embodiments, the blade length extends 2 cm outward from the universal attachment port (80). In some embodiments, the universal attachment port (80) has a diameter size which corresponds directly to a blade size of the blade (71).

Figure 2:
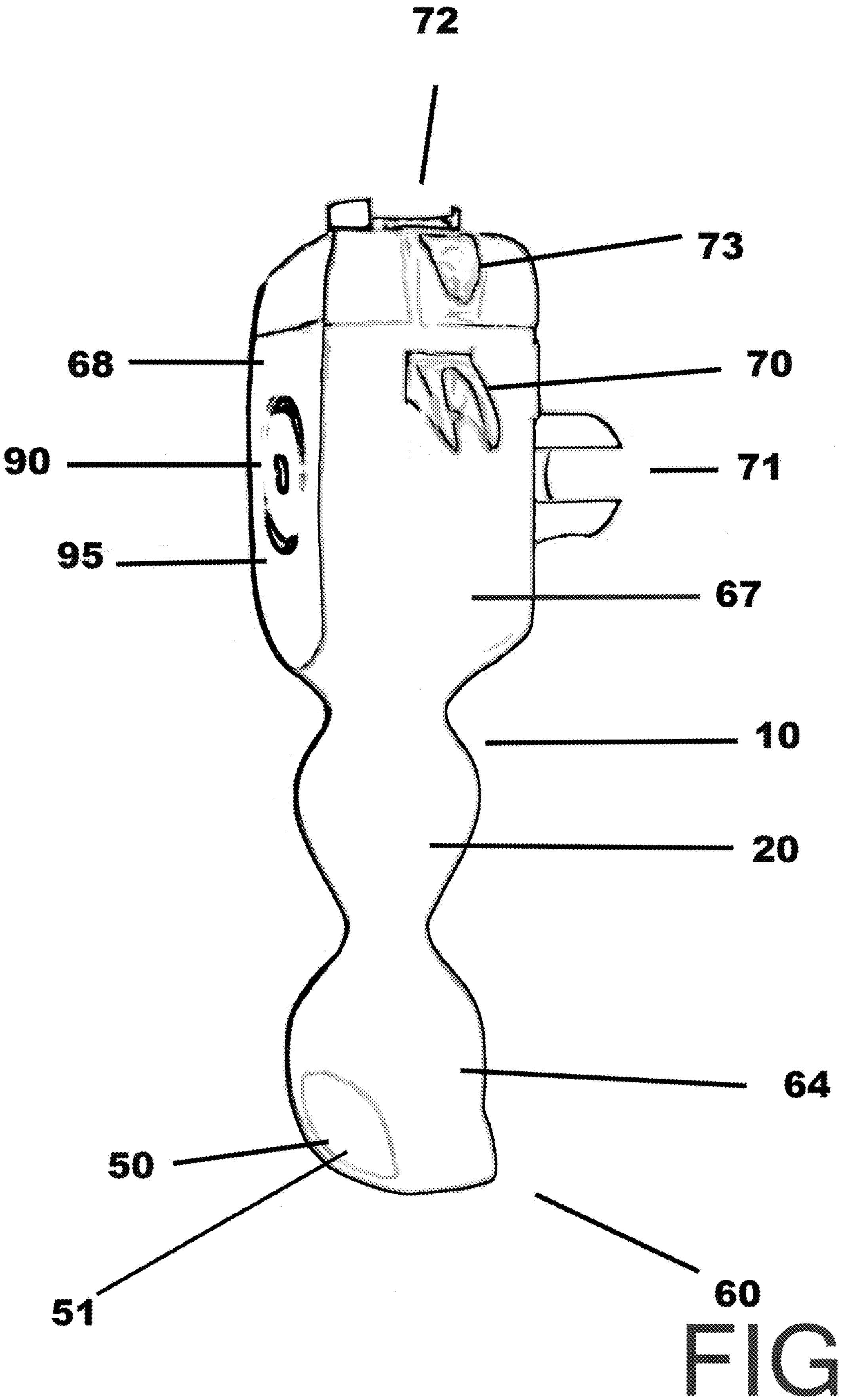
FIG. 2 shows a perspective view of the tool in its whole form featuring sides two and three.

As shown in FIG. 2, side (67) houses the nail claw (70) and the wall pivot feature (73) (or point) for the claw (70) that remove and support removal of the exposed fastener, respectively. The wall pivot feature (73) is positioned above the nail claw (70) on the side (67) or an edge of the head (30).

Figure 3:
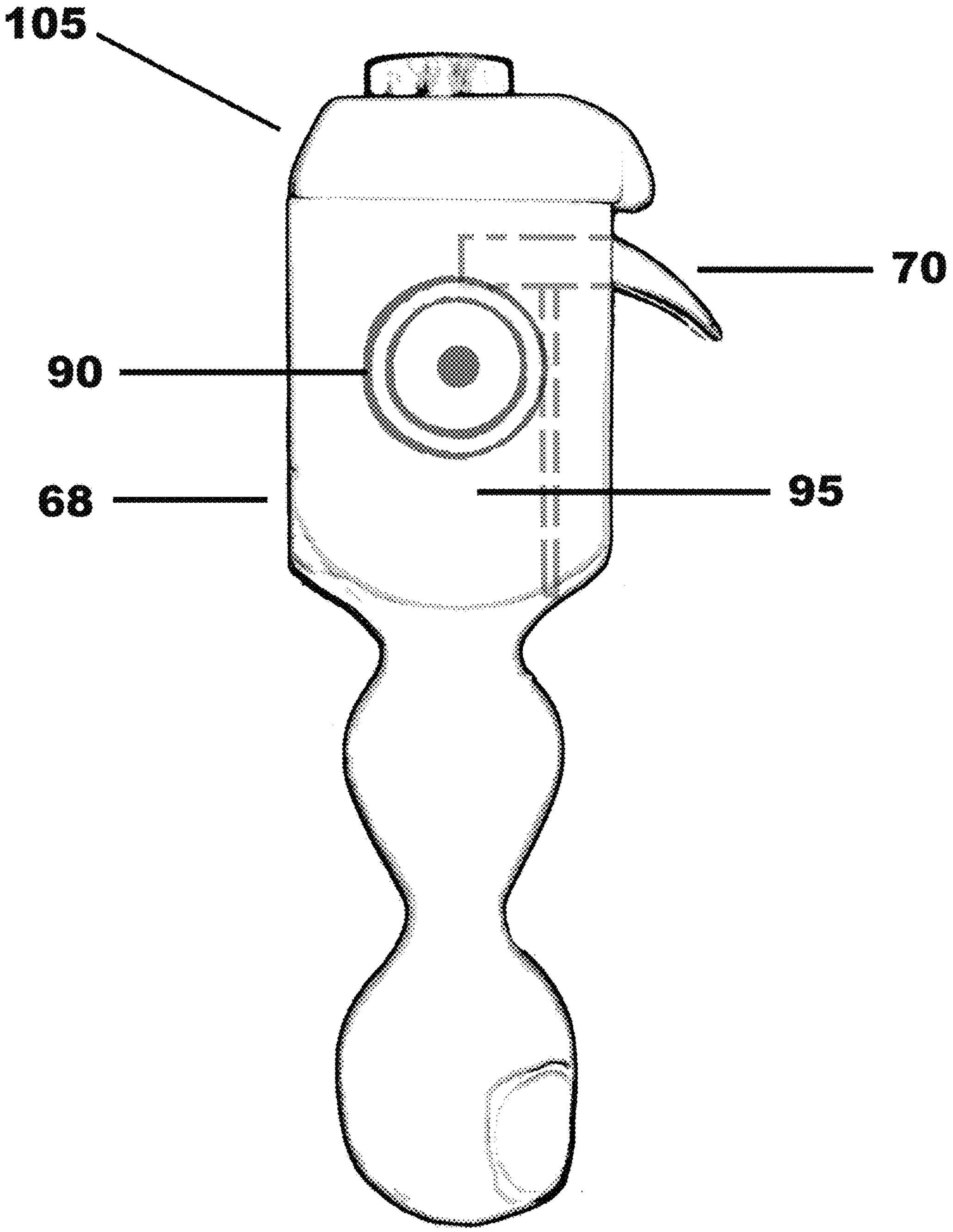
FIG. 3 shows a side view of the tool featuring side three. Superimposed lines indicate internal nail claw connection.

Side (68) displayed in FIGS. 2-3 contains a universal attachment port (90) and the strike surface (95) for universal attachment port (80). In the preferred form of the tool (10), the user would impact strike surface (95) for universal attachment port (80) with a hammer or rubber mallet.

Figure 4:
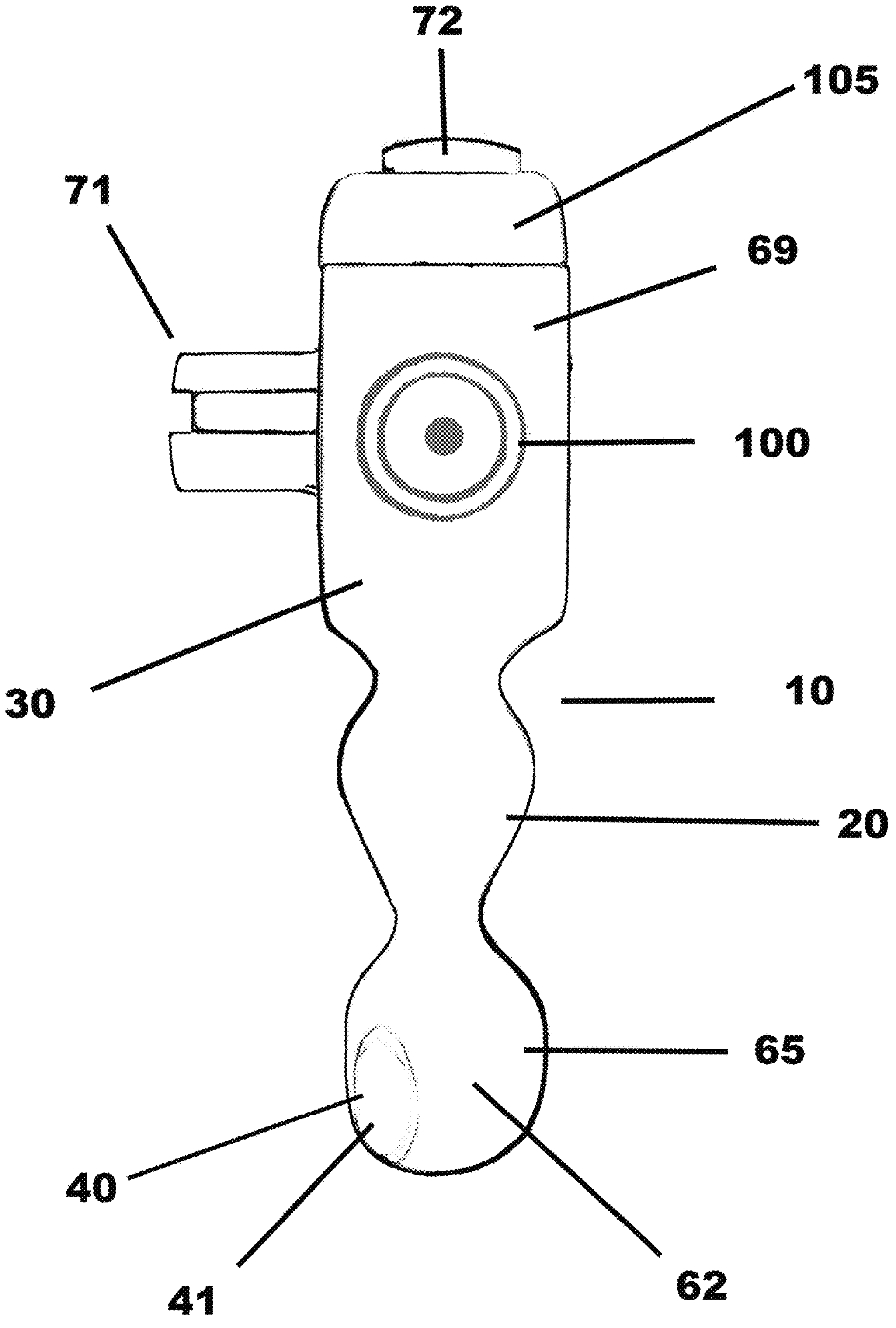
FIG. 4 shows a side view of the tool featuring side four.

Similarly, side (69) as seen in FIG. 4 contains a universal attachment port (100) and strike surface (105) for the claw (70).

Figure 8:
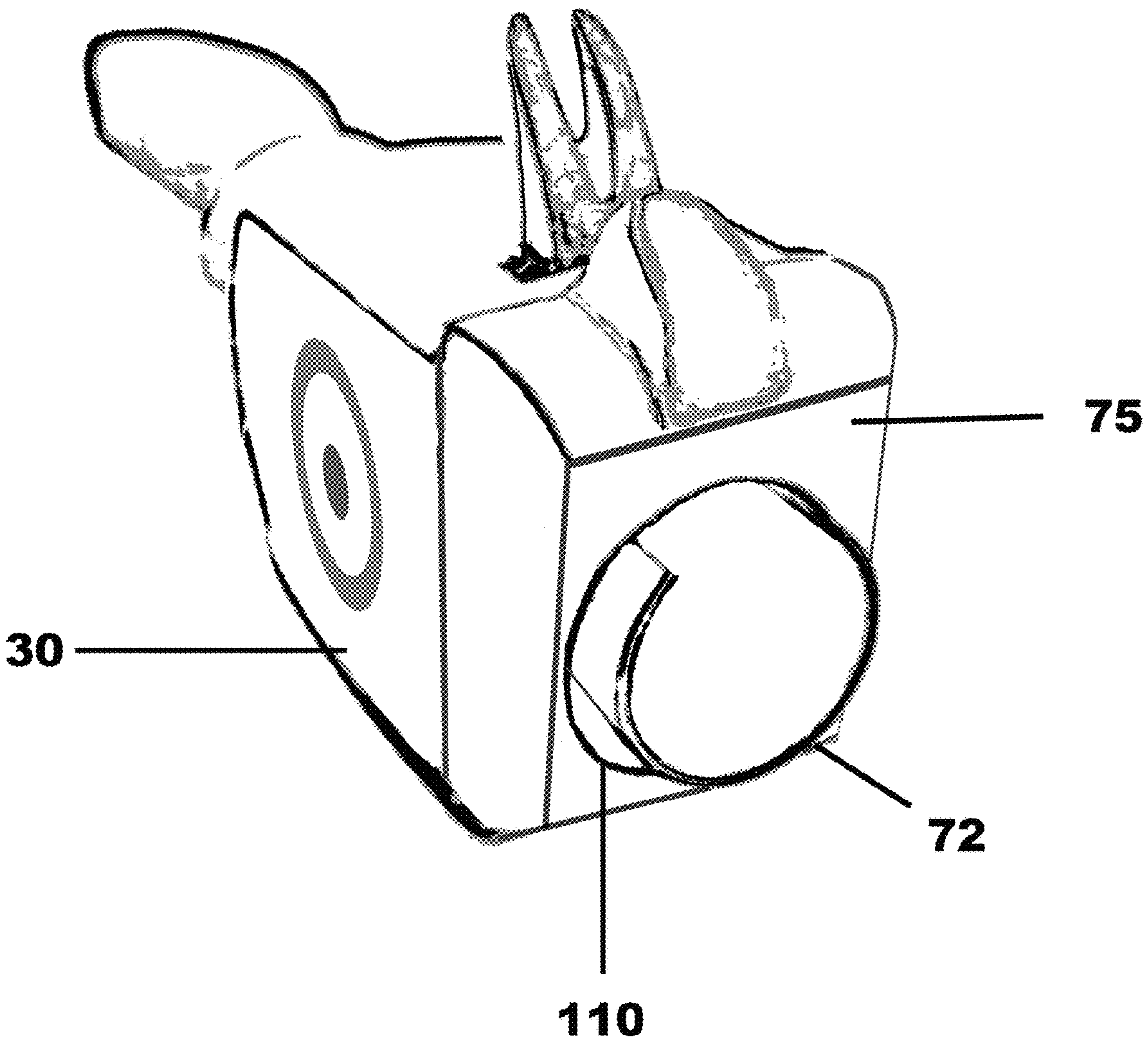
FIG. 8 shows a perspective view of side 5 and top blade.

Side (75) located at the top of the head (30) and shown in FIG. 8 accommodates a universal attachment port (110). The top blade (72), mounted in the universal attachment port (110), offers an option for tight corners on walls, ceilings, and floors.

Figure 10:
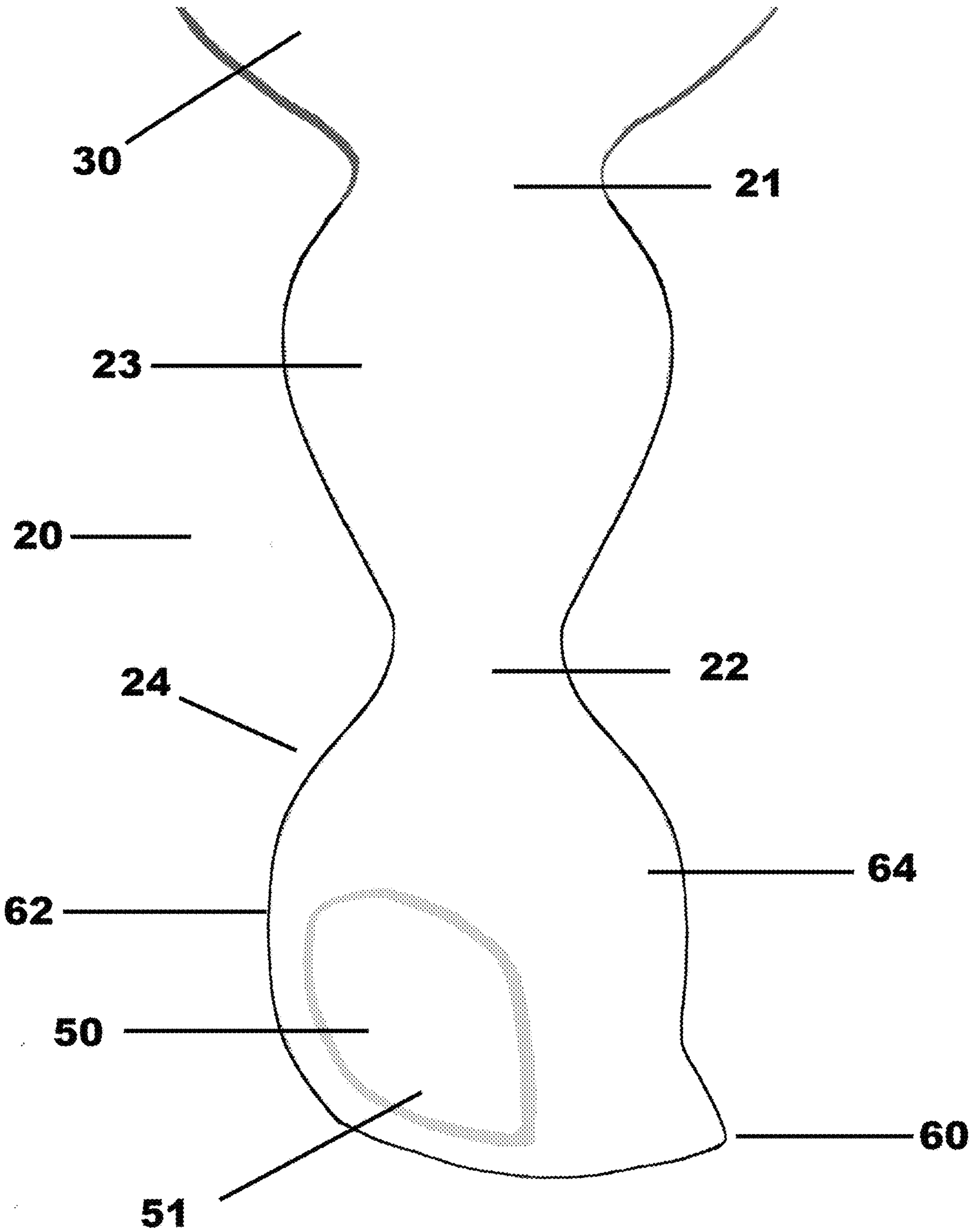
FIG. 10 is a detail side view of the handle, featuring the grip and the utility bulb with the penetration point in profile.

The handle (20) as detailed in FIGS. 1-6, 10 can be grasped by the user in multiple ways dependent on function. The exemplary embodiment shows the handle (20) comprised of the grip (23) and the utility bulb (24) as shown in FIGS. 1, 10. When using the side blade (71) on the multifaceted head (30), the user may hold the grip (23) in the hand with the handle (20) proximal to the wrist and the multifaceted head (30) distal to the wrist. The user places the side blade (71) at approximately a 45-degree angle on the surface of the substrate adjacent to filler layer damage to be removed. A hammer or rubber mallet is used to drive the strike surface (95) with consecutive purposeful strikes to achieve penetration of the substrate surface and the wedging effect that disperses the material. When using the top blade (72) (FIG. 8), the multifaceted head (30) is held in one hand. The other hand will use the mallet to drive the strike surface (74) for the universal attachment port (110) and/or the top blade (72) seen in FIGS. 5, 8. Shown in FIGS. 1, 10 the grip (23) is connected to the multifaceted head (30) and the utility bulb (24) by narrow connecting segment (21) and narrow connecting segment (22). As both ends of the tool are necessary in utility function to complete the task of filler layer damage repair, both connecting segments are slimmed to a diameter intended for finger placement, while the grip (23) is wider and intended to be wider for the palm area of the user's hand to grasp. When using the utility bulb (24) the handle (20) is held with the multifaceted head (30) proximal to the wrist.

Figure 7:
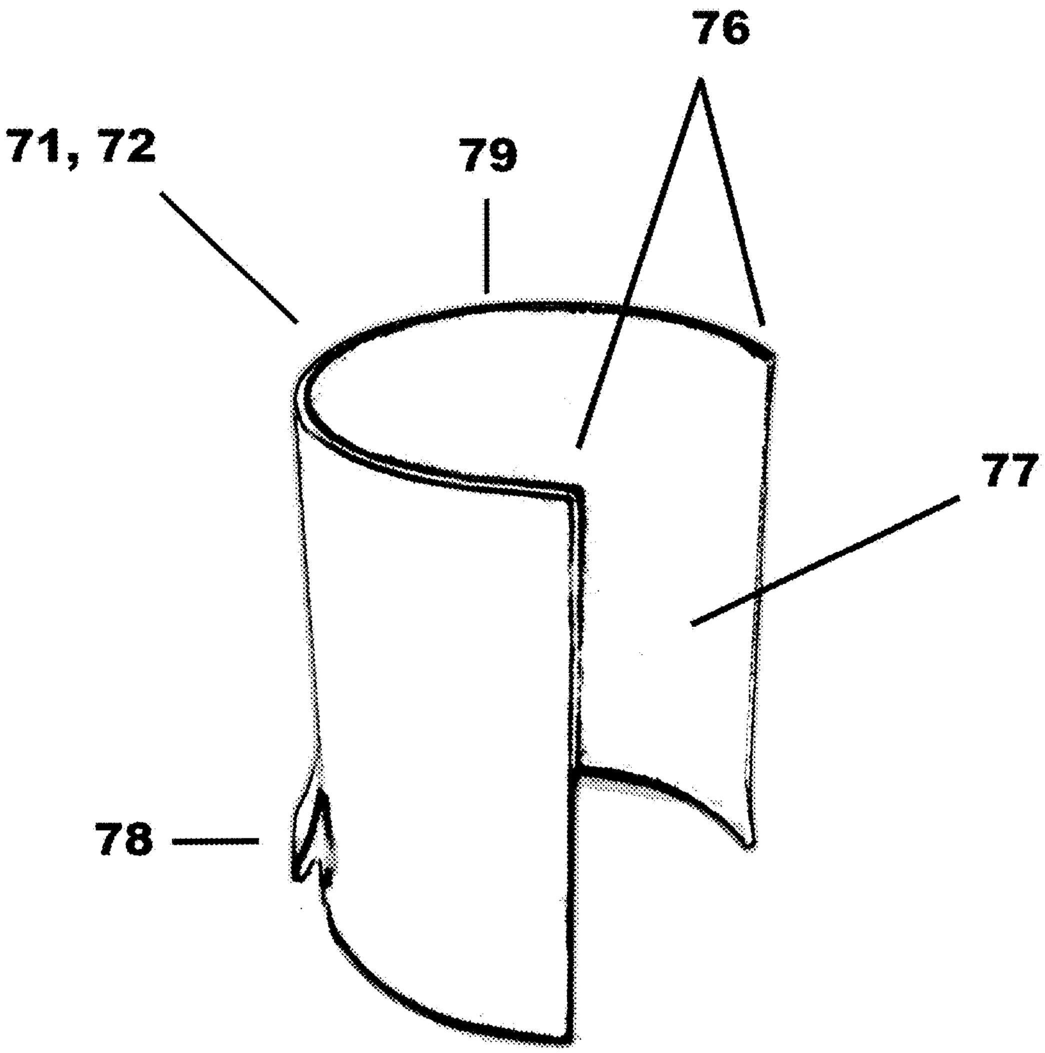
FIG. 7 shows a perspective view of an exemplary blade design of the tool.

In the exemplary embodiment, the side blade (71) and the top blade (72) are arced, as opposed to completely circular, as detailed in FIG. 7. FIG. 7 illustrates the blade wings (76), blade opening (77), blade edge (79) and blade stabilizer (78) that helps balance the blade (71,72) when connected to (any) universal attachment port (80,90,100,110). The open arc design of the blade (71,72) having corners may be advantageous for scraping and/or cutting when necessary.

FIGS. 3-4 show the strike surface (105) for claw (70) to be driven by rubber mallet or hammer. Once the exposed fastener is pulled by the claw (70), the tool (10) is then rotated 180 degrees to use the indentation peen (65) (see FIGS. 4, 9*d*). The indentation peen (65) is placed over the substrate cavity. The mallet is used on the strike surface (64) for the indentation peen (65) (see FIG. 9*a*) while user moves the indentation peen (65) in a circular motion over the substrate cavity until the desired concave effect is achieved.

The penetration point (60) shown in FIGS. 1, 2, 9*a*, 9*b*, 9*c*, and 10 is located at the proximal end of the handle (20) between side (66) and side (67). The user will hold the tool (10) by the grip (23) with the utility bulb (24) distal to the wrist to use the penetration point (60). Strike surface (62) (see FIG. 4, 9*d*) is used for penetration point (60). Penetration point (60) is another substrate indenting implement in the form of a small pointed triangular tip, used to indent any small areas of debris on the substrate, to reset a non-threaded fastener, or to aid in further indentation of the substrate cavity, thereby assisting the indentation peen (65) if needed.

Figure 9C:
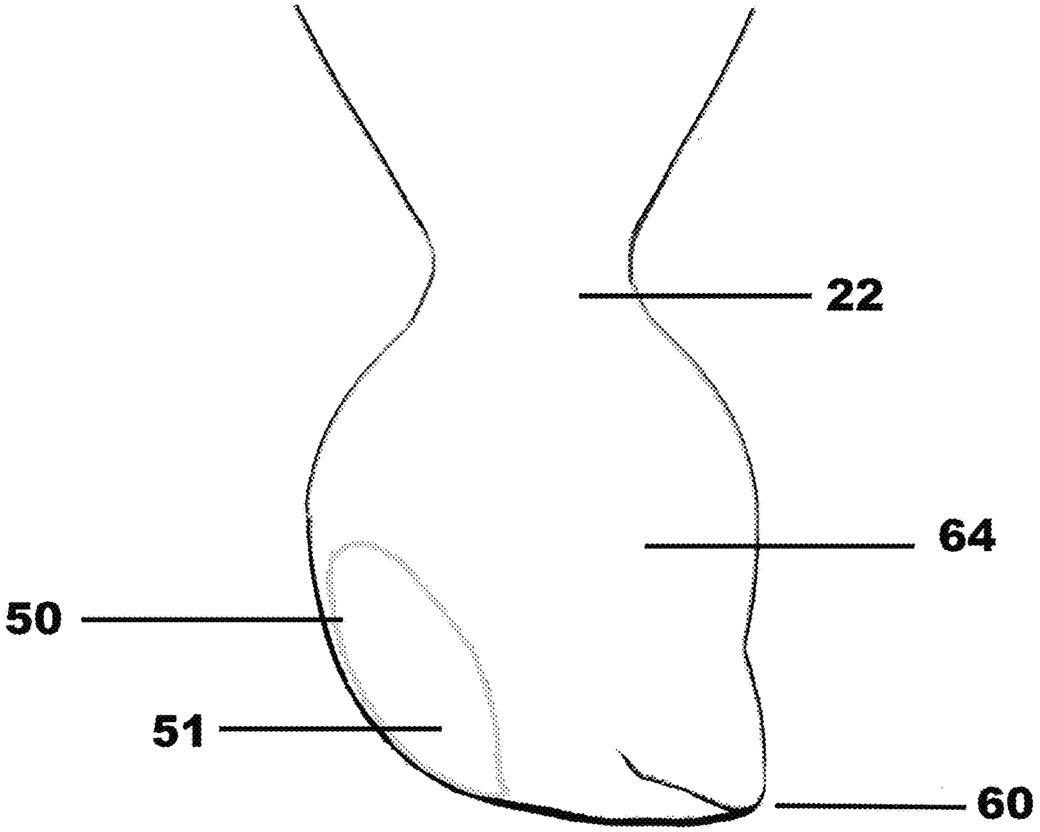
FIG. 9*c* is a detail perspective view of the utility bulb on side 2-3.
Figure 9D:
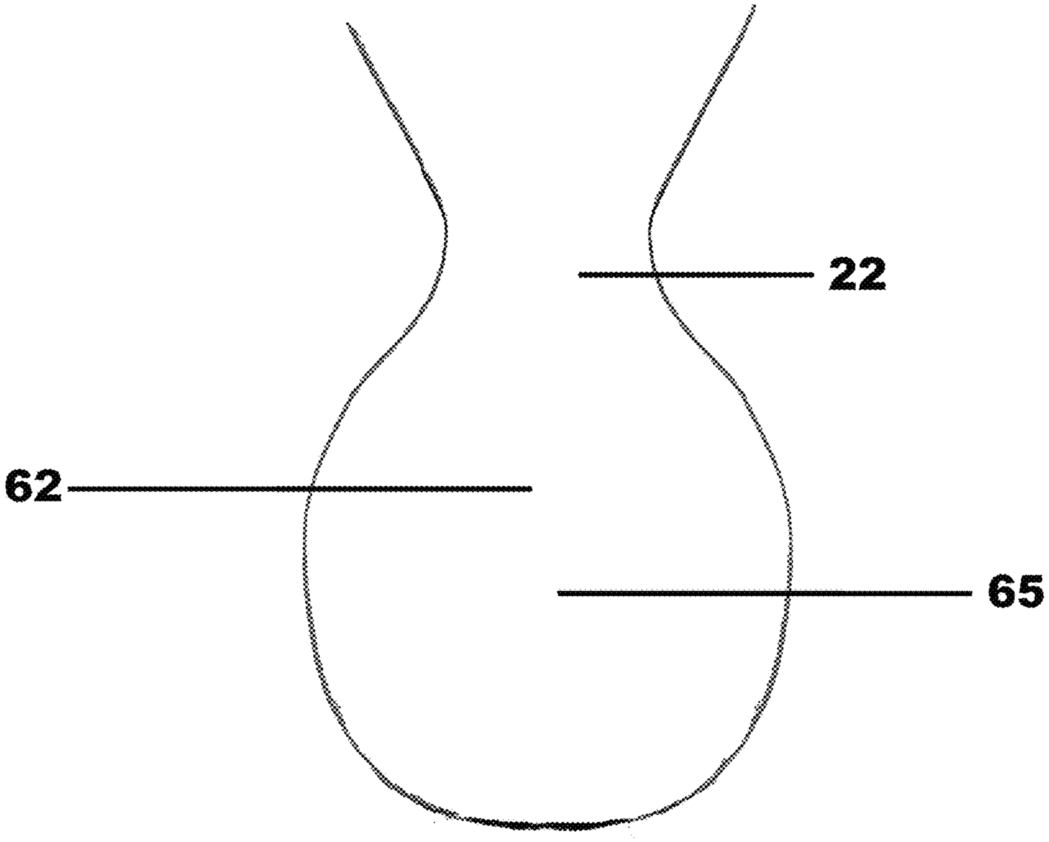
FIG. 9*d* is a detail side view of the utility bulb, featuring the rounded indentation peen.

In some embodiments, additional features of the utility bulb (24) include an abrasive surface (40) on side (66) as seen in (see FIG. 2,4, 9*a*) as well as an abrasive surface (50) on a side (see FIGS. 2, 9*c*, 10). These are used to smooth and remove any additional cracked surface debris on the perimeter of the exposed cavity following use of the indentation peen (65), penetration point (60) or at any time desired in process. In some embodiments the abrasive surface is a small piece of sandpaper cut to shape and attached within abrasive surface bed(s) (41), (51) with adhesive. In some embodiments the abrasive surface beds (41,51) may be the same shape and size as the sandpaper and set in relief 0.2 cm. In some embodiments the abrasive surface (40), and abrasive surface (50) may be set within these abrasive surface beds (41,51).

Some embodiments may use a clamping bracket, or loop and hook fasteners may be used to secure the abrasive elements. Some embodiments may use a coating with an abrasive element contained and applied as a liquid and then hardened for use.

The tool according to the present invention may include varied blade shapes to accommodate for difficult locations and shape necessities. Some embodiments may include razor cutting implements.

The universal attachment ports may include mechanisms to secure the attachments. For example, some embodiments may have insert threaded capabilities for attachments.

Various other features may be incorporated into the tool described above. For example, some embodiments of the tool may include a scraping tool or elements relating to any substrate repair. Some embodiments may have wall stud finder element. Some embodiments may have a laser level or laser measuring device.

Some embodiments may be driven by air or other engineered force. Some embodiments may have a tethering system for fastening when not in use. Some embodiments may exclude protruding wall pivot feature (73).

The present invention is also directed to a method for revealing wall fasteners in drywall and other interior wall substrates underneath filler layers. To remove damaged filler layer and existing fastener and to prepare the substrate for new filler layer, the tool (10) according to the present invention may be used as described in the following steps.

With the side blade (71) mounted in the attachment port (80), a user holds the tool (10) by the grip (23), so the multifaceted head (30) is distal to the wrist and places the side blade (71) at an approximately 45-degree angle (e.g., 40-50 degrees) to the substrate filler layer to be removed. The user may use mallet to impact the strike surface (95) opposite the blade (71) as many times as necessary, such as three times. The user may, following the circular contour of blade edge (79), reposition on substrate adjacent to filler layer damage over and repeat strikes, and repeat rotation and strikes until cavity encompassing fastener(s) has been excavated to satisfaction.

Next, new fasteners may be installed in anchor studs. A user may then hold the tool (10) by the grip (23) so that the multifaceted head (30) is distal to the wrist and place the nail claw (70) in position to pull the old fastener, and impact strike surface (105) for the claw (70) with the mallet until the nail claw (70) has secured around the fastener (e.g., nail) shaft. Pushing the grip (23) upward toward the substrate on the wall pivot feature (73) for the claw (70) will pull the old fastener(s). The user may then reposition the grip (23) in the hand so that the utility bulb (24) is distal to the wrist, position the indention peen (65) over the excavated cavity to be dressed, and impact strike surface (64) for indentation peen (65) lightly with the mallet while tracing the excavated perimeter to indent rough paint edges and paper layer, if needed, until a desired concave cavity is achieved. The user may place the penetration point (60) over any area of the cavity for further indentation, and impact the strike surface (62) for penetration point (60) lightly with the mallet to achieve a desired further indentation. Further, the utility bulb (24) may be rotated so the abrasive surfaces (40,50) can be lightly swiped over the cavity perimeter to further remove rough paint edges at any time necessary during process. Finally, the cavities are filled with a new filler layer. As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A surface wedge tool, comprising:
- a handle;
- a head on the handle having a plurality of sides and a distal end, a first attachment surface on one of the sides of the head, and a second attachment surface on the distal end of the head;
- an arced blade removably attachable to the first and the second attachment surfaces, the arced blade having an arc shaped cross-section in a plane perpendicular to an axis of the arced blade and an arc shaped distal end;
- a first striking surface on the head opposite the first attachment surface;
- a peen on a bottom portion of the handle; and
- a second striking surface on the handle for the peen,
- wherein each of the first and second attachment surfaces includes a port with an arc shaped slot for receiving the arced blade.

2. The tool of claim 1, further comprising:
- a nail claw attached to the tool;
- a third striking surface opposite to the nail claw.

3. The tool of claim 2, wherein the nail claw is mounted on the head.

4. The tool of claim 1, further comprising:
- one or more penetration protrusions;
- a striking surface for one or more penetration protrusions.

5. The tool of claim 4, wherein the penetration protrusions are on the bottom portion of the handle.

6. The tool of claim 1, further comprising:
- an abrasive surface attachment or coating on the bottom portion of the handle.

7. The tool of claim 1, wherein the head has a rectangular cross-section.

8. The tool of claim 1, further comprising:
- a nail claw attached to one of the plurality of sides;
- a striking surface on one of the plurality of sides opposite of the nail claw.

9. The tool of claim 8, further comprising:
- a wall pivot point for the nail claw attached above the nail claw on one of the plurality of sides of the head.

10. The tool of claim 1, wherein the arced blade has an open side defined between two opposing edges and extending from a proximal end to the distal end of the arced blade.

11. The tool of claim 1, wherein the arc shape of the distal end of the arced blade is an at least partial circle having an arc length of at least % of a circle.

12. A surface wedge tool, comprising:
- a handle having a rectangular head with a plurality of ports, each of the ports having an arc shaped slot;
- a first arced blade attached to one of the ports on a first side of the head and extending outward from the first side along a first axis, the first arced blade having an arc shaped cross-section in a plane perpendicular to the first axis and an arc shaped distal end;
- a first striking surface for the first arced blade on a second side of the rectangular head opposite the first side;
- a nail claw attached to a third side of the head;
- a peen on a bottom portion of the handle;
- a second striking surface on the handle for the peen; and
- a second arced blade attached to one of the ports on a distal surface of the head and extending outward from the distal surface along a second axis, the second arced blade having an arc cross-section in a plane perpendicular to the second axis and an arc shaped distal end.

13. The tool of claim 12, wherein the first arced blade has an open side defined between two opposing edges and extending from the first side of the head to the distal end of the first arced blade.

14. The tool of claim 12, wherein the arc shape of the distal end of the first arced blade is an at least partial circle having an arc length of at least % of a circle.

15. A method of exposing and removing wall fasteners under filler layer, and preparing substrate surface for new filler layer application, comprising the steps of:
- providing a tool having a handle, a head on the handle having a plurality of sides and a distal end, a first attachment surface on one of the sides of the head, and a second attachment surface on the distal end of the head, an arced blade removably attachable to the first and the second attachment surfaces, the arced blade having an arc shaped cross-section in a plane perpendicular to an axis of the arced blade and an arc shaped distal end, a first striking surface on the head opposite the first attachment surface, a peen on a bottom portion of the handle, and a second striking surface on the handle for the peen, wherein each of the first and second attachment surfaces includes a port with an arc shaped slot for receiving the arced blade;
- placing an enclosed side of the arced blade of the tool at 40-50 degree angle to a wall adjacent to a filler layer material to be removed;
- striking the tool with a mallet to achieve a first desired cut;
- striking the tool with a mallet to achieve a second desired cut, and repeating until a portion of the filler layer material is removed;
- driving replacement fasteners;
- pulling old fasteners with the nail claw of the tool;
- indenting a substrate cavity with the peen of the tool;
- applying an abrasive element to cavity perimeter; and
- applying a new filler layer.

16. The method of claim 15, wherein the tool includes the abrasive element.

17. The method of claim 15, wherein the tool further includes a penetration protrusion.

* * * * *